UNITED STATES PATENT OFFICE 2,238,961

DYESTUFF OF THE ANTHRAPYRIDONE SERIES

Alexander J. Wuertz, Villa Monterey, Del., and William Dettwyler, Pitman, N. J., assignors to E. I. du Pont de Nemours & Company, Wilmington, Del., a corporation of Delaware No Drawing. Application August 10, 1938, Serial No. 224,118

1 Claim. (Cl. 260—278)

This invention relates to the preparation of a new dyestuff of the anthraquinone series, and it has for its object to prepare a new vat dyestuff of the anthraquinone series, from readily available dyestuff intermediates, which dyes cotton from the usual alkaline hydrosulfite vat in desirable red shades of good strength and fastness properties.

A large amount of research has been carried out in the past twenty years in developing dyestuffs in the anthraquinone field, and to provide a range of colors which have good fastness and dyeing properties. Vat dyestuffs of the anthraquinone field are in demand at the present time because of their improved fastness over many of the existing types. Desirable red dyestuffs in this field, however, are difficult to obtain and today a great deal of work is being done to prepare compounds in the anthraquinone vat dye class which will dye in fast bright red shades and which will exhibit good fastness properties.

In German Patent 194,253, the preparation of a series of dyestuffs is described which in the form of their sulfonic acids dye in red shades. In this series, the condensation product of 2:6-diaminoanthraquinone with bromoanthrapyridone is mentioned, and apparently considered as being useful, if at all, only after sulfonation as an acid wool dye. We have found that this product (before sulfonation) is of no value whatsoever as a vat dye, for it dyes cotton from the usual alkaline hydrosulfite vat in dull, weak, bluish violet shades, not of sufficient strength or of a shade that would permit its use commercially as a vat dye. As the sulfonic acid, it is, of course, not substantive to cotton and is, therefore, not a dye for that fiber.

German Patent 217,395 describes the preparation of a red vat dye by condensing 4-amino-2-methylanthrapyridone with 2:6- or 2:7-dichloranthraquinone. In German Patent 217,396, it is pointed out that the same dye is obtained where the 4-halogen-2-methylanthrapyridone is condensed with 2:6-diaminoanthraquinone. However, these products, like the compounds of German Patent 194,253 are not of commercial interest.

We have found that, contrary to what would be expected from the teachings of the German patents above mentioned, a new and valuable red vat dyestuff can be prepared by condensing one mole of 2:6-dichloroanthraquinone with two moles of 4-amino-N-methylanthrapyridone, and that the product, as distinguished from the compound obtained by condensing 4-chloro-N-methylanthrapyridone with 2:6-diaminoanthraquinone, dyes from the ordinary hydrosulfite vat in desirable bright red shades of good strength and fastness properties, and which is particularly suitable for use in pigment pad reduction dyeing.

The following example is given to illustrate a preferred process for preparing this color. The parts used are by weight.

Example 1

20 parts of 2:6-dichloroanthraquinone, 40 parts of 4-amino-1:9(N)-methylanthrapyridone are condensed in 700 parts of nitrobenzene in the presence of 20 parts of soda ash and 4 parts of cuprous chloride at reflux temperature for 20 hours. The mass is then cooled to 100° C. and poured into 1000 parts hot water and the nitrobenzene removed with steam. The so-obtained crude product is a dark red powder, soluble in concentrated sulfuric acid with a violet color. The pure color is obtained by fractionation from 75% sulfuric acid from which it crystallizes in bright red needles. This pure product dyes cotton in strong bluish red shades from a red vat, and exhibits good all around fastness properties.

The condensation reaction may, of course, be carried out in other organic solvents, and the amounts of alkali and copper catalyst varied within the limits usually employed in anthrimide condensation.

We claim:

The product obtained by condensing two moles of 4-amino-N-methylanthrapyridone with one mole of 2:6-dichloroanthraquinone which dyes cotton from the usual alkaline hydrosulfite vat in bright bluish red shades of good strength and fastness properties.

ALEXANDER J. WUERTZ.
WILLIAM DETTWYLER.